3,300,135
THERMAL BYPASS VALVE WITH
BIMETALLIC CONTROL
George E. Slater, Willoughby Hills, and Don W. James, Kirtland, Ohio, assignors to Rockwell-Standard Corporation, Pittsburgh, Pa., a corporation of Delaware
Filed Sept. 3, 1964, Ser. No. 394,239
4 Claims. (Cl. 236—34.5)

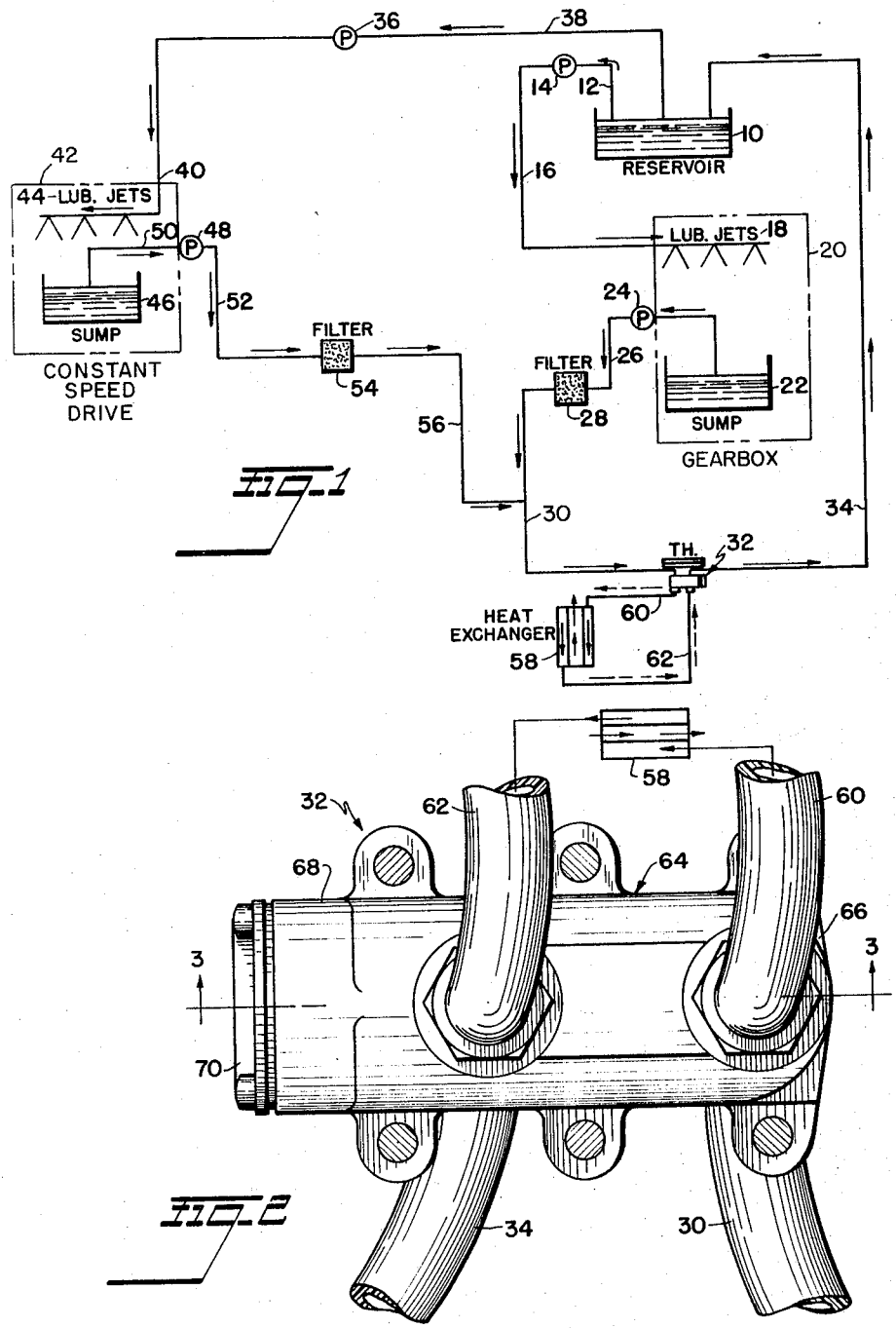

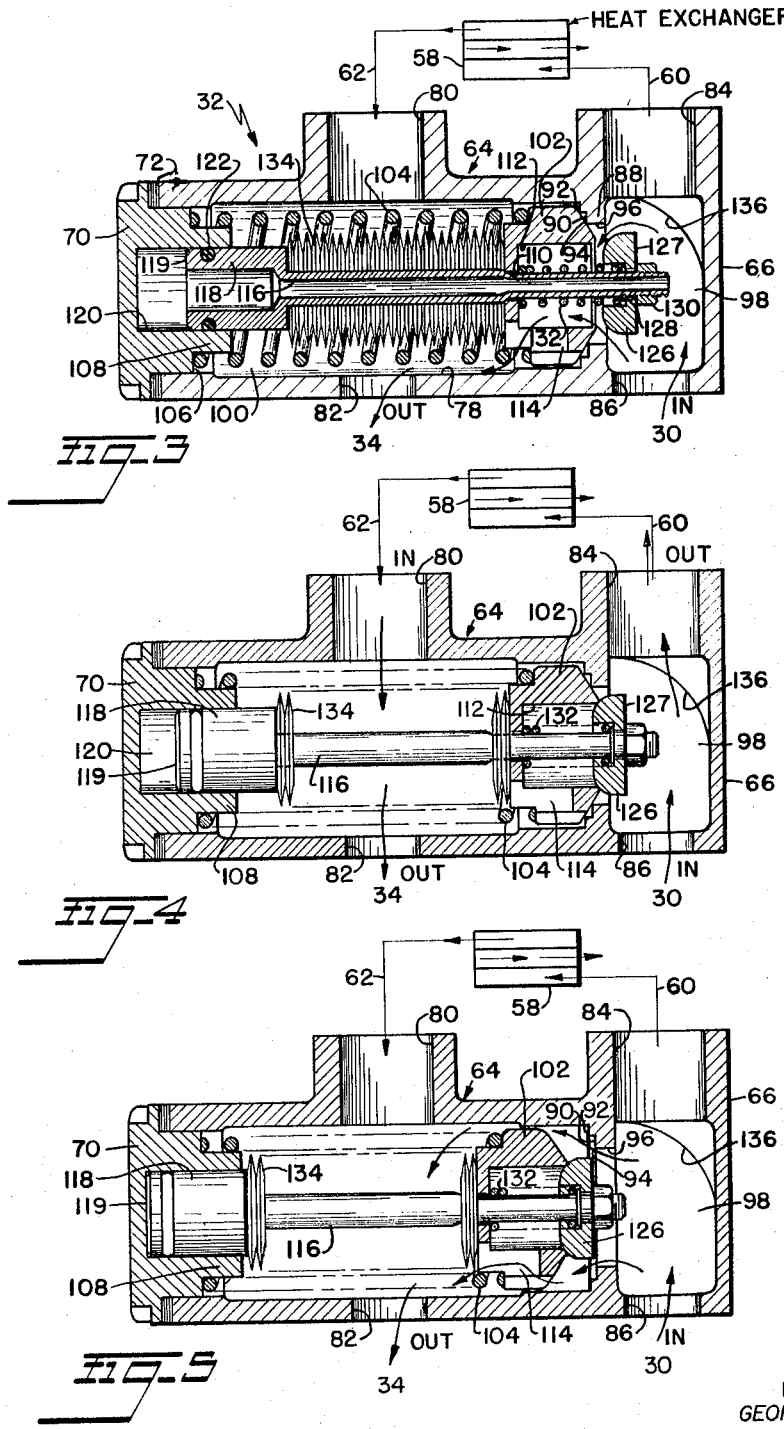

The present invention refers in general to fluid circuits, such as lubricating systems for speed transmissions in vehicles or airplanes incorporating a heat exchanger, and more specifically to a bypass for such systems.

In lubricating systems for high speed transmissions, especially such as used in aircraft, it is known to incorporate a heat exchanger in the system to prevent the lubricating oil from being ovehheated and thus cause malfunction in the transmission system. At the same time, it is desirable to keep the lubricating oil at a certain minimum temperature for better lubricating characteristics. For this reason, it has been known to incorporate a heat responsive bypass valve in such systems to bypass the fluid circuit to the heat exchanger. This provides a fast heat rise for the lubricating oil which is desirable for proper performance of the transmission system. However, upon reaching a predetermined temperature level, the bypass is automatically closed and the oil is directed through the heat exchanger for cooling. When the temperature of the oil has dropped sufficiently to a predetermined value, the valve again acts to open the bypass and thus allow the oil again to bypass the heat exchanger. In this way, the temperature of the lubricating oil is always kept at a certain desirable level.

Prior heat responsive valve means for such fluid systems have been comprised largely of thermostats using wax filled cartridges. However, these thermostats are limited in regard to the temperature level and will not perform at high temperatures.

The thermostatic valve device of the present invention is designed to overcome this deficiency by being operable at high temperatures. To this effect, bimetallic elements are utilized instead of the formerly used wax filled cartridges.

In addition, the thermostatic valve device of the present invention provides a safety feature in that when the fluid pressure in the system exceeds a certain value, such as may occur when the fine passages in the heat exchanger become plugged, the valve also will be actuated so that the fluid bypasses the heat exchanger.

Accordingly, the main object of the present invention is to provide a bypass valve means for a high temperature fluid system operable in response to the temperature and/or pressure of the fluid used in the system.

Another object is the provision of a thermostatically controlled bypass valve means incorporating a unique arrangement of bimetallic discs as the valve actuating thermal elements.

Still another object resides in the combination of a thermal and pressure differential valve in a high temperature fluid system having a primary and a secondary circuit, the valve being operable in response to the temperature or pressure of the fluid to open or close either circuit.

A further object is the provision in a high temperature lubricating system for a vehicle transmission incorporating a heat exchanger, of a thermal bypass valve with bimetallic control which is normally in a position to prevent fluid flow through the heat exchanger. The valve, however, is positioned by means of the bimetallic elements to direct fluid flow through the heat exchanger when the temperature in the system exceeds a certain value. This same valve means is further equipped with a pressure sensitive means which acts under a certain fluid pressure differential to again prevent fluid flow through the heat exchanger.

Further objects and novel features will become evident by the following detailed description in connection with the appended drawings in which:

FIGURE 1 is a schematic diagram of a typical circuit embodying the present invention;

FIGURE 2 is an enlarged external view showing the valve body separated from the fluid circuit in FIGURE 1;

FIGURE 3 is a section of FIGURE 2 along the line 3—3 showing the valve in bypass position;

FIGURE 4 is a similar section showing the valve in position to direct fluid through the heat exchanger or other secondary fluid circuit; and FIGURE 5 is the same view as FIGURE 4 showing the valve again in bypass position actuated by the pressure responsive means.

With reference to FIGURE 1, the schematic fluid system shown therein is illustrative only and it will be understood that other similar fluid systems embodying primary and secondary fluid flow circuits may be substituted.

FIGURE 1 illustrates by way of example, a lubrication system for a constant speed drive 42 and a gear box 20 of a turbo-jet aircraft engine (not shown) from the main lubrication fluid reservoir 10. Fluid is pumped through line 12 by a pump 14 into line 16 which is connected to a number of lubricating jets 18 to provide the gear box 20 with lubricating fluid. The used lubricant is collected in a sump 22 from which it is pumped by a scavenger pump 24 through line 26 into a filter 28 from which the fluid flows through line 30 into the thermal valve 32 and out again through line 34 back into the main reservoir 10 to complete the lubricating circuit for the gear box.

Another pump 36 pumps lubricant from the main reservoir 10 from line 28 through line 40 into the constant speed drive 42 in which lubricating jets 44 provide the transmission with lubricant which is collected in a sump 46. Another scavenger pump 48 pumps the fluid from sump 46 through lines 50 and 52 through a filter 54 from which the lubricant flows through lines 56 and 30 into thermal valve 32 and through line 34 back into main reservoir 10 to complete the lubricating circuit for the constant speed drive.

It will be noted that thermal valve 32, which is the subject matter of the present invention, serves circuits for both constant speed drive 42 and gear box 20.

A heat exchanger 58 is conveniently connected by conduit 60 to the output side of thermal valve 32 and the output end of the heat exchanger by conduit 62 to the input end of the valve. It will be understood that any known conventional heat exchanger may be incorporated and this device does not form a part of the present invention.

Thermal valve 32 normally functions as a bypass valve to bypass heat exchanger 58. Fluid normally flows from line 30 to line 34 through the valve because the back pressure or pressure drop through heat exchanger 58 is higher than through valve 32. However, when the temperature of the lubricating oil rises above a predetermined desirable operating temperature, the thermal valve diverts the oil through the heat exchanger, i.e. the oil goes into the valve at 30 and out at 60, through heat exchanger 58, into the valve again through conduit 62 and out of the valve into the return line 34. Conversely, when the temperature of the oil drops sufficiently, the valve again acts to bypass the heat exchanger circuit.

The second bypass action occurs when the fluid pressure goes beyond a designed safe pressure when the fluid is flowing through the heat exchanger. This may occur when the fine passages in the heat exchanger become clogged after repeated use. Under these conditions valve 32 causes the lubricant to bypass the heat exchanger even though the heat responsive valve part in valve 32 is in the position to direct oil flow through the heat exchanger. In other words, the action of the pressure responsive means overrides and nullifies the prior action of the heat responsive means. Valve 32 will now be described in detail with reference to FIGURES 2 to 5.

Valve 32 comprises valve body 64 which is closed at one end by a cover 70 sealed by a gasket 72. The valve housing is longitudinally bored to provide a valve chamber 78 which is open to two pairs of oppositely disposed apertures 80, 82, 84 and 86 respectively, which provide connections for the conduits 60 and 62 to the heat exchanger and 30 and 34 to the lubricating circuit. The valve chamber 78 has an internal flange section 88 which is recessed to provide two sharp radial edges 92 and 94 immediately adjacent a central aperture 96. Aperture 96 provides selective fluid communication between the rear part 98 of valve chamber 78 and front part 100 thereof.

Edges 92 and 94 on the internal flange 88 provide a seat for a valve head 102 which is held in contact therewith by a coil spring 104 the opposite end of which abuts cover 70 and extends around a guide boss 108. Valve head 102 has a central aperture 110 which expands into a larger recess 112 providing a substantially hollow open valve head body. A number of equally spaced gate openings 114 in the side walls of valve head 102 provide communication from internal recess 112 into valve chamber 78. Recess 112 of valve head 102 is normally open towards the rear part 98 of the valve chamber but will be closed under certain circumstances by the following means.

A hollow plunger rod 116 extends through valve head aperture 110 and axially through valve chamber 78 towards the front of the valve and is provided with a piston 118 which extends into a cylinder 120 in boss 108. Piston 118 is provided with an O-ring 122 to seal cylinder 120 from valve chamber 78. The other end of plunger rod 116 extends through recess 112 of valve head 102 and is provided at this end with another smaller valve head 126 arranged in opposition to valve head 102 and adapted to close recess 112 under certain conditions. Valve head 126 is held to hollow plunger rod 116 between a snap ring 128 and a nut 130. End 127 of valve head 126 is approximately equal in surface area to end 119 of piston 118. A coil spring 132 coiled around plunger rod 116 normally biases smaller valve head 126 so that fluid communication exists between rear part 98 and front part 100 of valve chamber 78 through recess 112 and side gates 114 of valve head 102.

A series of bimetallic discs 134 is interposed between valve head 102 and piston 118 positioned around plunger rod 116 for a purpose to be described. These discs may be composed of a thermostatic bimetal such as for instance, that manufactured by the Chace Company under their specification No. 6650. For the purpose of illustration, this bimetallic material is applicable in a useful deflection temperature range from −100° F. to +400° F. The deflection property of this material is used by assembling a number of such discs in a stack around the hollow plunger stem 116 between valve head 102 and plunger piston 118. As the temperature of the fluid rises, the expanding force of the bimetal discs 134 opposes the force of the small coil spring 132 which normally holds valve head 126 away from valve head 102. At an operating temperature of 200° F., the spring pressure as well as the drag imposed by the piston O-ring 122 is completely overcome and the valve is rapidly closed to assume a position illustrated in FIGURE 4. It will be understood that in other applications bimetaals of different composition for different operating temperatures may be employed, and that the above values have been given only for purposes of illustration.

Under normal operating conditions the lubricating fluid enters the thermal bypass valve through line 30 at port 86 into the rear part 98 of the valve chamber 78 from which the fluid is deflected by means of a curved deflector surface 136 and by the open smaller valve head 126 into the recess 112 in valve head 102 through side gates 114 into the front chamber part 100, past the bimetallic discs 134 and out through the port 82 into return line 34. This position of the valve is illustrated in FIGURE 3.

When the lubricating oil becomes too hot for safe operation, the bimetallic discs 134 expand between the valve head 102 which is seated against the valve seat 92, 94 and piston 118 with the result that piston 118, hollow rod 116, and valve head 126 are displaced to the left until valve head 126 comes into seating contact with valve head 102, closing the recess 112 and shutting off fluid communication between rear part 98 and front part 100 of valve chamber 78. The expanding force of the bimetallic discs does not have to overcome the hydraulic forces on end 119 of piston 118 because these forces are cancelled by the opposing force on end 127 of valve head 126 which is approximately equal in area to end 119. This position of the valve is illustrated in FIGURE 4. The hot lubricating oil is now forced to flow through the rear valve chamber part 98, out through port 84 and through line 60 into the heat exchanger 58 (FIGURE 1). From there the oil flows back through line 62, through port 80 into front valve chamber part 110, past bimetallic discs 134 and out through port 82 into return line 34.

When the temperature of the lubricating oil has sufficiently decreased, heat sensitive bimetallic discs 134 which are in constant fluid contact contract again and coil spring 132 displaces small valve head 126 away from valve head 102 to once again open direct communication between rear part 98 and front part 100 of valve chamber 78, as illustrated in FIGURE 3.

However, assuming again the closed position of the bypass as shown in FIGURE 4, if a fluid pressure differential exists such as occurs when the fine passages in the heat exchanger become plugged, the valve assumes a position illustrated in FIGURE 5. Increased pressure acting upon both valve heads 102 and 126, that exceeds the pressure on end 119 of piston 118 and the force of spring 104, causes the entire assembly positioned around the hollow plunger 116 to be displaced towards the front of the valve against the opposing force of the spring 104 and the pressure on end 118 unseating valve head 102 from its valve seats 92, 94 and opening aperture 96. Thus, fluid under excessive pressure is allowed to flow from the rear chamber part 98 through aperture 96 into the front chamber part 100 through side gates 114 in valve head 102 out through port 82, bypassing heat exchanger 58. Upon restoration of the predesigned fluid pressure, the coil spring 104 expands again and moves the valve assembly back to the FIGURE 4 position or, if the temperature of the lubricant has been sufficiently reduced, to the FIGURE 3 position.

Thus the present invention provides an effective, quick acting heat and/or pressure responsive bypass valve means for a fluid system incorporating a dual valve unit operable independently upon a difference in temperature or pressure.

By the present novel structure of the valve and positioning of the heat sensitive bimetal discs, the sensing device is in contact with the oil at all times whether the oil goes through the bypass or through the heat exchanger, assuring a quick response upon a change in temperature.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A bypass valve for a fluid system having a primary and secondary fluid circuit, comprising:
   (a) a valve body open at one end and divided by an inwardly extending annular flange into first and second chamber portions, said first and second chamber portions being in open communication with said primary and secondary circuits, said second chamber portion containing the open end of said valve chamber;
   (b) a cover adapted to close said open end of said valve body and having an inwardly facing recess;
   (c) a guide piston slidably mounted in said recess and having a hollow piston rod;
   (d) a first valve head having a recess communicating with a series of open side gates slidably mounted on said piston rod and being adapted to sealingly engage said inwardly extending annular flange;
   (e) a second valve head mounted on said piston rod and adapted to sealingly engage a wall of said recess of said first valve head, said piston rod extending through said second valve head to vent said recess;
   (f) a temperature responsive actuating means surrounding said piston rod and connected to said piston and to said first valve head;
   (g) a coil spring compressed between said first and second valve heads to urge said valve heads apart;
   (h) a second coil spring compressed between said cover and said first valve head, whereby in response to the temperature of said fluid reaching a predetermined level said temperature responsive actuating means moves said first valve head into sealing engagement with said second valve head, and in response to a predetermined pressure on said first and second valve head, said valve heads are moved together and said second valve head is forced out of sealing engagement with said flange, and in response to reduction in temperature or pressure the original position of the respective valve heads is resumed.

2. The bypass valve of claim 1 in which said temperature responsive actuating means is a series of bimetallic discs.

3. For use in a system for supplying lubricating oil under pressure to a device, said system including a reservoir, said device, a heat exchanger, and pump means: a valve assembly for selectively delivering oil from said device to said heat exchanger or returning the oil to said reservoir, said valve assembly comprising a body having a first chamber having an inlet connected to receive oil from said device and an outlet connected to deliver oil to said heat exchanger and second chamber having an inlet connected to receive oil from said heat exchanger and an outlet connected to deliver oil to said reservoir, an apertured wall separating said chambers, the aperture in said wall forming a by-pass connection through said valve assembly, an apertured valve member adapted to seal against a seat around the aperture in said wall, spring means for urging said apertured valve member against said seat, a second valve member adapted to seal the aperture in said apertured valve, member and temperature responsive means operatively connected at its opposite ends to said valve members and operable to move said second valve against said apertured valve member when the temperature of said oil exceeds a predetermined value to close said by-pass passage, and said valve members being movable together against the resistance of said spring means to open said by-pass passage when the pressure differential between said first and second chambers exceeds a predetermined value.

4. For use in a system for supplying lubricating oil under pressure to a device, said system including a reservoir, said device, a heat exchanger, and pump means: a valve assembly for selectively delivering oil from said device to said heat exchanger or returning the oil to said reservoir, said valve assembly comprising a body having a first chamber having an inlet connected to receive oil from said device and an outlet connected to deliver oil to said heat exchanger and second chamber having an inlet connected to receive oil from said heat exchanger and an outlet connected to deliver oil to said reservoir, an apertured wall separating said chambers, the aperture in said wall forming a by-pass connection through said valve assembly, means providing a recess at one end of said second chamber, a piston slidably received in said recess, a hollow piston rod rigid with said piston and extending through said second chamber into said first chamber to place said recess in constant communication with said second chamber, a movable valve assembly carried by said rod for selectively closing the aperture in said wall, a bimetallic assembly surrounding said hollow rod within said second chamber and adapted, upon an increase in the temperature of the oil to move said movable valve assembly to close said by-pass connection, and spring means operably connected to urge said movable valve assembly in a direction to close said by-pass passage.

References Cited by the Examiner

UNITED STATES PATENTS

| 2,400,615 | 5/1946 | Warrick et al. | 236—34.5 |
| 2,400,911 | 5/1946 | Booth | 236—34.5 |
| 2,516,390 | 7/1950 | Jensen | 236—92 X |
| 3,090,559 | 5/1963 | Bayer | 236—12 |
| 3,189,277 | 6/1965 | Fox | 236—101 |

FOREIGN PATENTS 461,707  2/1937  Great Britain.

EDWARD J. MIHCAEL, *Primary Examiner.*